United States Patent [19]

Cooperman et al.

[11] Patent Number: 5,774,463

[45] Date of Patent: Jun. 30, 1998

[54] SWITCHING MATRIX WITH CONTENTION ARBITRATION

[75] Inventors: Michael Cooperman, Framingham; Nee-Ben Gee, Needham; John Edmund Rathke, Waltham, all of Mass.

[73] Assignee: GTE Laboratories Incorporated, Waltham, Mass.

[21] Appl. No.: 581,722

[22] Filed: Dec. 29, 1995

[51] Int. Cl.[6] .................................................. H04L 12/50
[52] U.S. Cl. .......................................... 370/355; 370/381
[58] Field of Search ...................................... 370/357, 412, 370/413, 414, 415, 416, 417, 418, 461, 360, 216, 381, 389, 352, 355

[56] References Cited

U.S. PATENT DOCUMENTS

| | | | |
|---|---|---|---|
| 4,603,416 | 7/1986 | Servel et al. | 370/417 |
| 4,754,451 | 6/1988 | Eng et al. | 370/417 |
| 4,760,570 | 7/1988 | Acampora et al. | 370/417 |
| 4,829,475 | 5/1989 | Ward et al. | 365/78 |
| 4,862,412 | 8/1989 | Fried et al. | 365/49 |
| 5,130,947 | 7/1992 | Reed | 365/227 |
| 5,268,896 | 12/1993 | Pauwels | 370/413 |
| 5,301,055 | 4/1994 | Bagchi et al. | 359/139 |
| 5,345,229 | 9/1994 | Olnowich et al. | 340/825.8 |
| 5,367,520 | 11/1994 | Cordell | 370/395 |
| 5,404,537 | 4/1995 | Olnowich et al. | 370/388 |
| 5,406,554 | 4/1995 | Parry | 371/381 |
| 5,471,468 | 11/1995 | Sandin et al. | 370/389 |
| 5,506,809 | 4/1996 | Csoppenszky et al. | 365/221 |
| 5,511,070 | 4/1996 | Lyles | 370/411 |
| 5,513,134 | 4/1996 | Cooperman et al. | 365/49 |
| 5,517,495 | 5/1996 | Lund et al. | 370/399 |
| 5,519,698 | 5/1996 | Lyles et al. | 370/411 |
| 5,546,391 | 8/1996 | Hochschild et al. | 370/413 |
| 5,574,875 | 11/1996 | Stansfield et al. | 711/3 |
| 5,577,035 | 11/1996 | Hayter et al. | 370/395 |
| 5,583,861 | 12/1996 | Holden | 370/395 |
| 5,590,123 | 12/1996 | Lyles et al. | 370/397 |
| 5,612,951 | 3/1997 | Yu et al. | 370/395 |
| 5,636,210 | 6/1997 | Agrawal | 370/390 |

OTHER PUBLICATIONS

Schultz et al., "CAM–Based Single–Chip Shared Buffer ATM Switch," 1994 International Communications Conference, pp. 1190–1195 (1994).

Schultz et al., "Fully–Parallel Multi–Megabit Integrated CAM/RAM Design," IEEE, pp. 46–52 (1994).

Primary Examiner—Alpus H. Hsu
Assistant Examiner—Kwang B. Yao
Attorney, Agent, or Firm—Leonard C. Suchyta

[57] ABSTRACT

A switching matrix routes each received input to a unique output port. Each input specifies an output port as a destination. For each output port, a set of inputs contending for the output port is determined. A control for correctly routing selects an input from each set of contending inputs and routes it to the correct output port of the switching matrix. If no input specifies an output port as a destination, that output port is designated as an available output port. A control for misrouting determines the set of available output ports and the set of inputs that have not been correctly routed by the control for correctly routing. The control for misrouting then misroutes each remaining input to one of the available output ports of the switching matrix. The switching matrix may provide status signals for use by the switch in tracking the location of the correctly routed and misrouted inputs.

17 Claims, 6 Drawing Sheets

SWITCHING MATRIX WITH CONTENTION ARBITRATION

FIELD OF THE INVENTION

The present invention relates generally to electronic communications systems, and more particularly to apparatus for use in electronic signal switching systems.

BACKGROUND

The concurrently filed patent application for a Merged Buffer Signal Switch, herein incorporated by reference, describes a switch that receives input signals that are contending for the same output port of the switch. The Merged Buffer Signal Switch utilizes a circuit switch matrix that misroutes within a switching cycle all but one contending input signal for an output port to merged buffers that are associated with available other output ports. The switch then reroutes the misrouted outputs to the buffers associated with the correct output ports. An advantage of this architecture is that it allows increased number of ports over other switch architectures, without a corresponding loss of throughput per port.

OBJECTS OF THE INVENTION

Accordingly, a primary object of the present invention is to provide a circuit switch matrix that can support the Merged Buffer Signal Switch architecture and thereby avoid loss of throughput per port with an increase in the number of ports.

In particular, an object of the present invention is to systematically misroute all but one contending input signal for a destination output of the switch to an output port of the switch matrix that is not busy, and to provide information regarding that misrouting so that the signal switch can keep track of all inputs in order to reroute them to the correct output port.

SUMMARY

In one aspect of the present invention, input signals to a signal switch during a switching cycle are temporarily stored at the output ports of a switching matrix. Such inputs are stored temporarily until all inputs have been routed to an output port during the switching cycle. The present invention allows all output ports of the switching matrix to be utilized during each switching cycle in order to maximize throughput per port. Each input signal specifies an output port as its respective destination. For each output port, when more than one input specifies a particular output port as a destination, one input is correctly routed to the output port. All the other inputs contending for that output port are misrouted to an output port of the switching matrix that has not already received an input during that switching cycle. In one embodiment, status signals are provided from the switching matrix to the switch to indicate which inputs have been correctly routed to respective destination output ports and which inputs have been misrouted to other output ports of the switching matrix, thereby allowing the switch to keep track of all input signals.

BRIEF DESCRIPTION THE DRAWINGS

DETAILED DESCRIPTION OF THE PREFERRED EMBODIMENT

Figure 1:
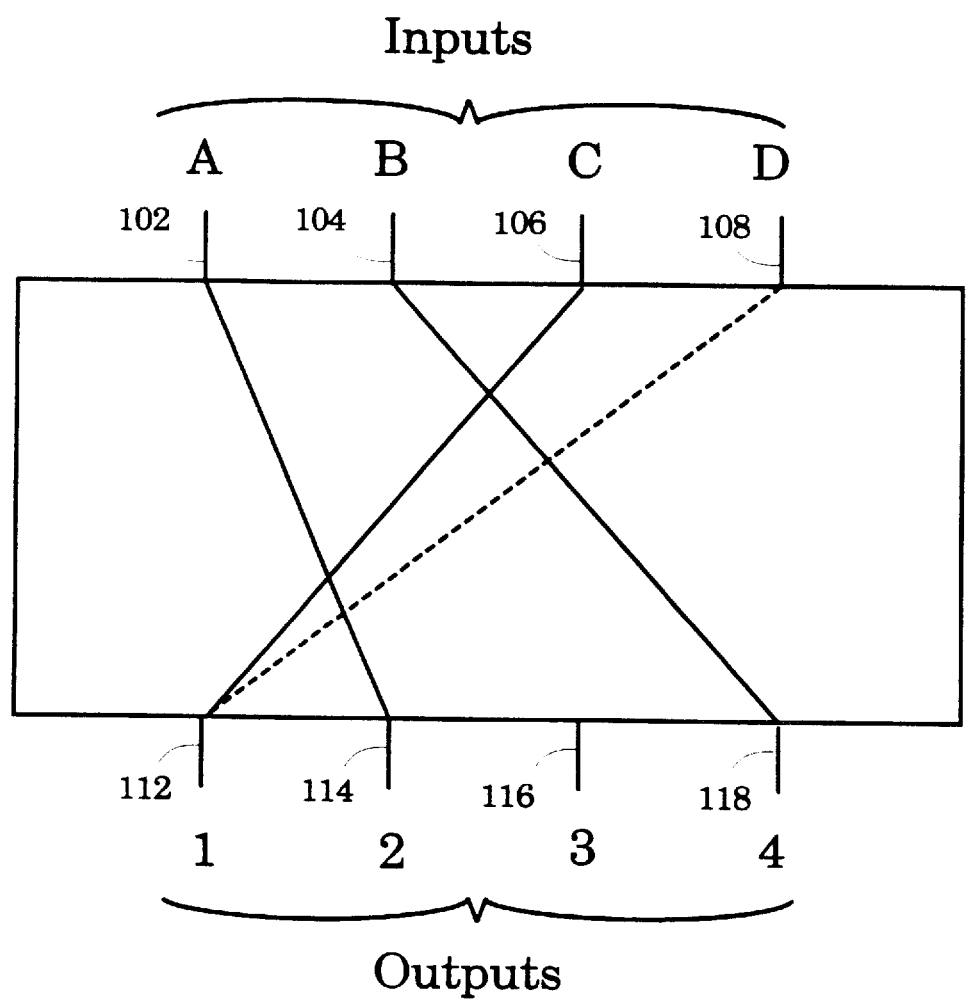
FIG. 1 shows a crossconnect configuration with four inputs and four output ports, where two of the input signals are contending for the same output port.

FIG. 1 shows a crossconnect configuration with four inputs to be switched among four output ports. Input A 102 specifies a second output port 114 as its respective destination, and Input B 104 specifies a fourth output port 118 as its respective destination. Since no other inputs specify the second or fourth output port as a destination, the solid lines show that input A would be correctly routed to the second output port and Input B would be correctly routed to the fourth output port.

Input C 106 specifies a first output port 112 as a respective destination while Input D 108 also specifies the first output port as a respective destination. The solid line shows that of these two inputs contending for output port one, Input C will be correctly routed to the first output port. Input D therefore cannot be routed to output port one because it is busy with Input C. Using the switching matrix of the present invention, Input D can instead be routed to any available output port to which an input has not already been routed. In this case, a third output port 116 is such an available output port, and Input D will be misrouted to this output port.

Figure 2:
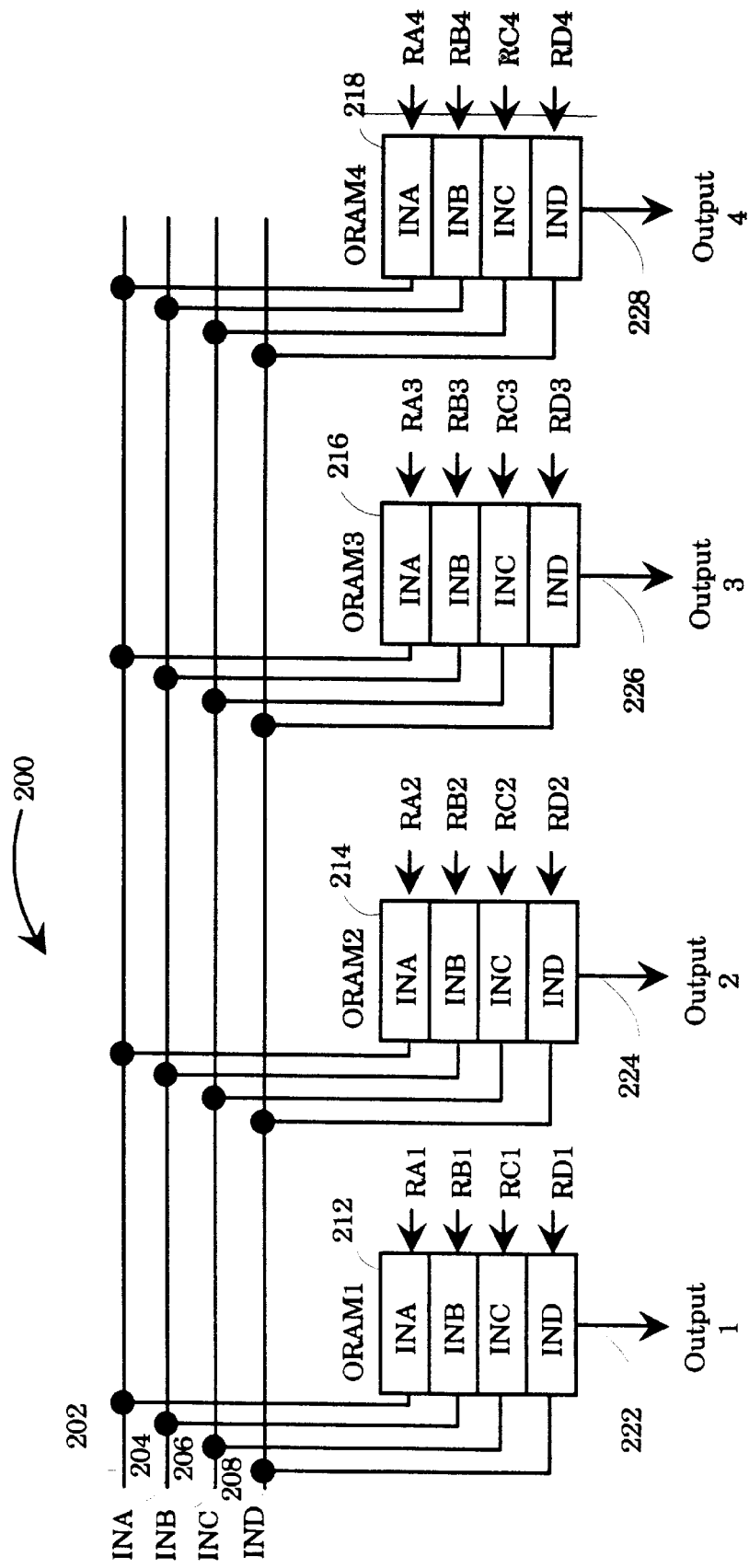
FIG. 2 shows an implementation of the crossconnect using orthogonal RAMs, according to a preferred embodiment of the switching matrix of the present invention.

FIG. 2 shows a 4×4 switching matrix crossconnect 200 using Orthogonal RAMs (ORAMs) according to one embodiment of the present invention. The operation of an ORAM is described in U.S. Pat. No. #4,736,361, *Digital Switching System with Two-Dimensional Addressing RAMs*, which is incorporated by reference. The ORAM can be utilized both for serial-to-parallel data conversion and as part of a switching matrix.

In the 4×4 switching matrix crossconnect 200 of FIG. 2, Input A 202, Input B 204, Input C 206, and Input D 208 are all stored in each of a first ORAM 212, a second ORAM 214, a third ORAM 216, and a fourth ORAM 218. The first ORAM is operatively connected to a first output port 222, the second ORAM is operatively connected to a second output port 224, the third ORAM is operatively connected to a third output port 226, and the fourth ORAM is operatively connected to a fourth output port 228.

Each ORAM inputs control signals that indicate which input is to be switched to the respective output port operatively connected to the ORAM. These control signals are determined using the destination specified by each input, and are read-signals to the ORAMs. Correctly route control signals RA1, RB1, RC1, and RD1 indicate which input should be routed to the first output port 222. Likewise, RA2, RB2, RC2, and RD2 indicate which input should be routed to the second output port 224, RA3, RB3, RC3, and RD3 indicate which input should be routed to the third output port 226, and RA4, RB4, RC4, and RD4 indicate which input should be routed to the fourth output port 228.

Using the example inputs of FIG. 1, Input A 202 is routed to the second output port 224. Thus, control signal RA2 would be high indicating that Input A stored in the second ORAM 214 should be read and routed to the second output port. Input B 204 is routed to the fourth output port 228, and control signal RB4 would be high indicating that Input B stored in the fourth ORAM 218 should be read and routed to the fourth output port. Input C 206 is routed to the first output port 222, and control signal RC1 would be high indicating that Input C stored in the first ORAM 212 should be read and routed to the first output port. The other correctly route control signals remain in a low state.

Because the first output port 222 is already busy with Input C, Input D 208 is misrouted to an available output port, the third output port 226. A separate set of misroute control signals that indicate the inputs to be misrouted is provided to the ORAMs. The misroute control signals are PA1, PB1, PC1, and PD1; PA2, PB2, PC2, and PD2; PA3, PB3, PC3, and PD3; and PA4, PB4, PC4, and PD4, and they direct the ORAMs to misroute particular inputs.

Figure 3:
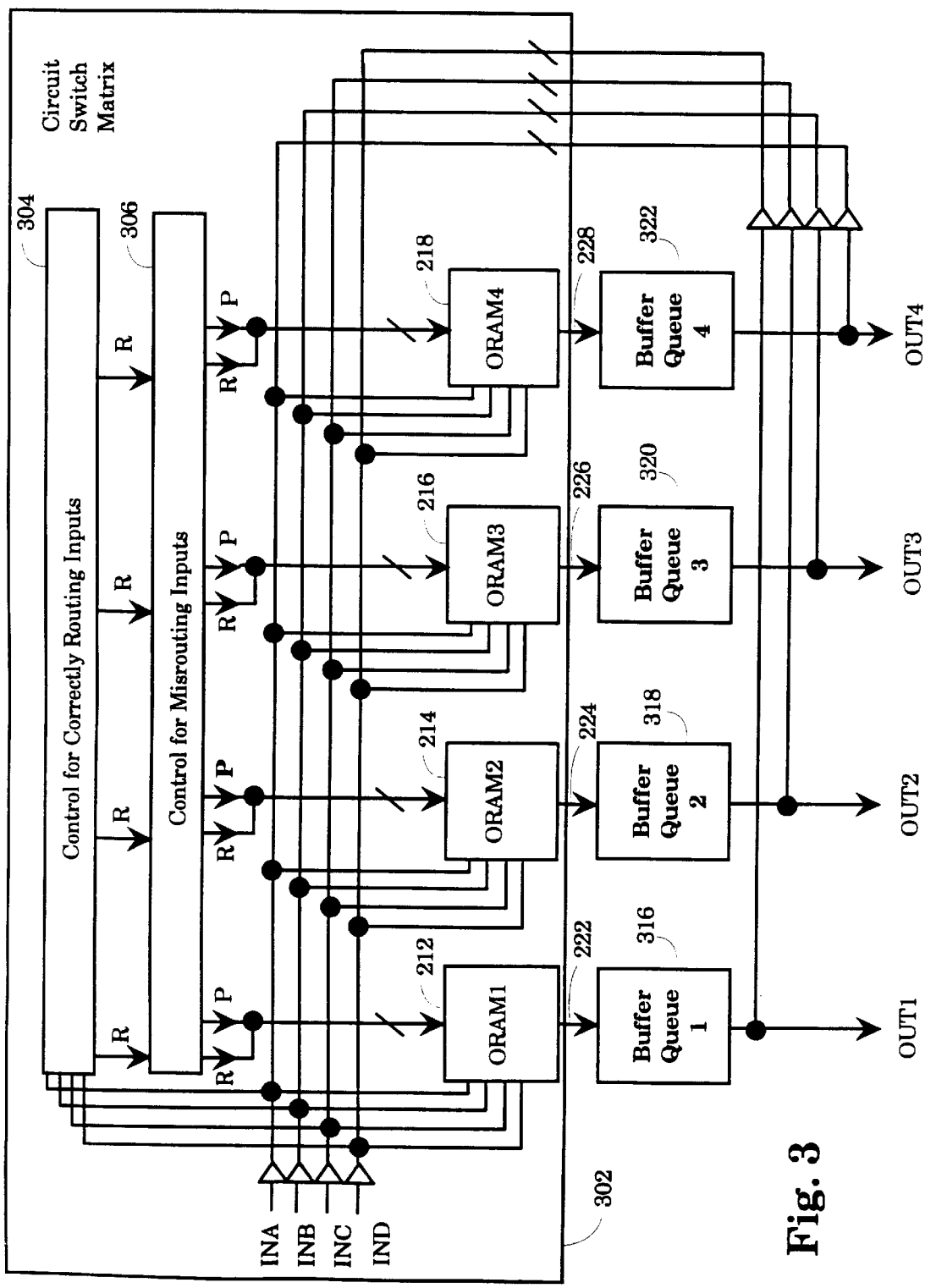
FIG. 3 shows the elements of the switching matrix of the present invention and how these elements fit into a Merged Buffer Signal Switch, according to a preferred embodiment of the present invention.

FIG. 3 shows a preferred embodiment of the circuit switch matrix 302 of the invention as part of a four input to four output Merged Buffer Signal Switch. The circuit switch matrix includes a control for correctly routing 304, a control for misrouting 306, and four ORAMs 212, 214, 216, and 218. Each of the four ORAMs is operatively connected to a respective one of four buffer queues 316, 318, 320, and 322 of the Merged Buffer Signal Switch. Transmission of inputs between the ORAMs and the buffer queues is generally a parallel transfer.

The control for correctly routing 304 provides correctly route control signals via connections 308, 310, 312, and 314 to direct the ORAMs to read and then route inputs to their correct respective destinations. Each of the lines 308, 310, 312, and 314 depicted in FIG. 3 represents four connections, as indicated by the cross-hatch line. These control signals are then provided to the ORAMs and the control for misrouting 306.

The control for misrouting 306 receives the correctly route control signals from the control for correctly routing 304 in order to determine which contending inputs were not correctly routed and what are the output ports that remain available. Thus, the correctly route control signals also act as correct route status signals indicating which of the inputs has been routed to which of the output ports.

The control for misrouting provides misroute control signals via connections 308, 310, 312, and 314 to direct the ORAMs to read and then misroute the inputs that have not been routed by the control for correctly routing. These misroute control signals can also be used as misroute status signals to indicate which of the inputs have been misrouted to which of the outputs.

The Merged Buffer Signal Switch may also include a CAM control (not shown in FIG. 3) which is operatively connected to the four buffer queues 316, 318, 320, and 322, the control for correctly routing 304, and the control for misrouting 306. The CAM control can receive the correct route status signals from the control for correctly routing and the misroute status signals from the control for misrouting. From these signals, the CAM control can track where each of the inputs has been routed in order to implement the rerouting operation of the Merged Buffer Signal Switch. The misrouted input signals are rerouted by the Merged Buffer Signal Switch to the circuit switch matrix 302 as the same type of data stream as the received input signals. If necessary to accomplish this, parallel-to-serial conversion is performed.

Figure 4:
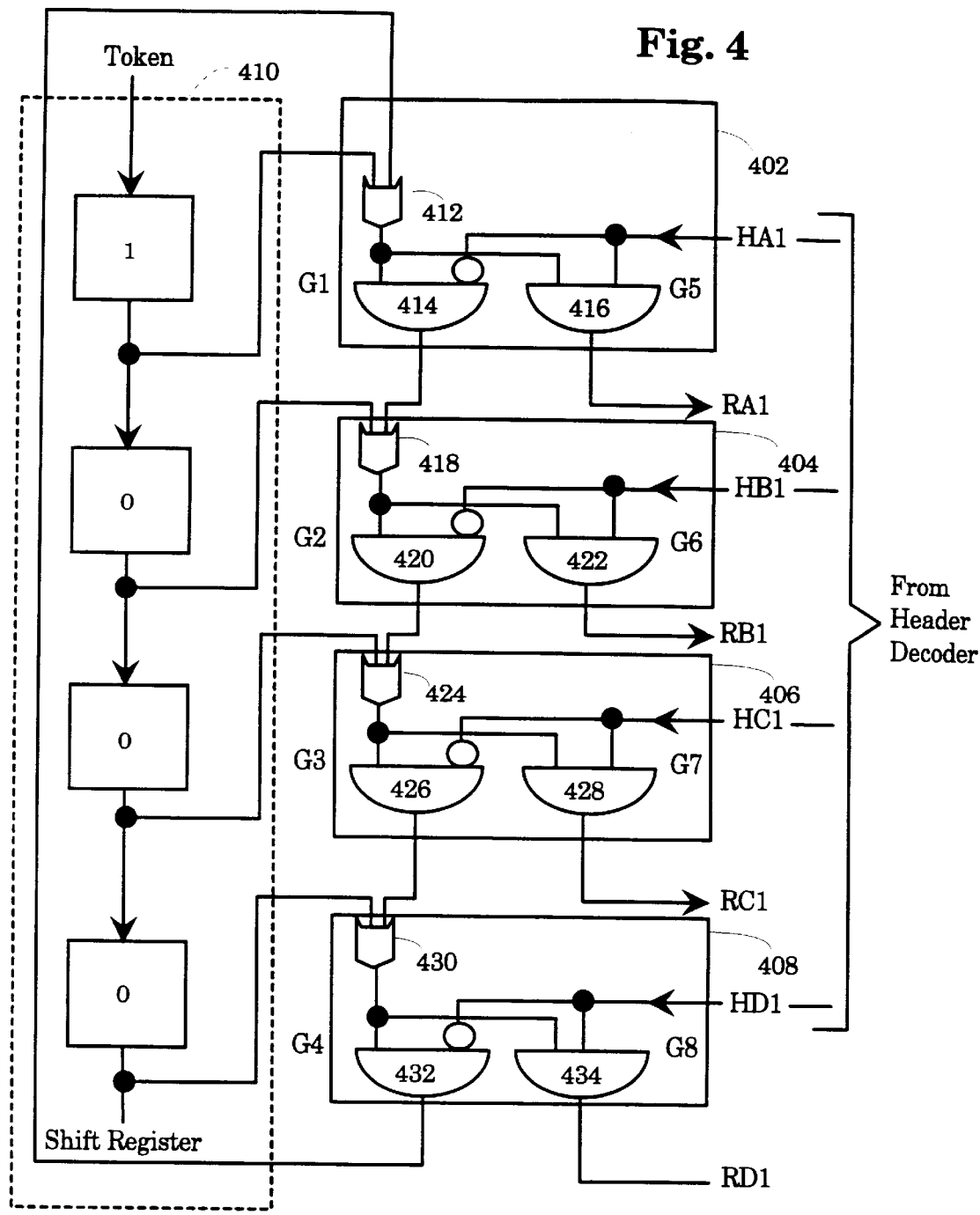
FIG. 4 shows a schematic diagram of a control unit for selecting an input signal from a set of contending input signals that specify a particular output port of the switching matrix as a respective destination and for correctly routing the input signal to the output port, according to one embodiment of the present invention.

A preferred embodiment of a unit of the control for correctly routing, shown in FIG. 4, generates correctly route control signals for controlling one ORAM. In FIG. 3, the control for correctly routing 304 would include four such units for controlling the four ORAMs. Again using the example in FIGS. 1 and 2, the first ORAM 212 correctly routes Input C to the first output port 222. Thus for the correctly route control signals sent to the first ORAM 212, control signal RC1 is high, and control signals RA1, RB1, and RD1 are low.

The correctly routing control unit for the first ORAM 212 receives header decode control signals HA1, HB1, HC1, and HD1 from a header decoder that can be part of the signal switch. The header decoder determines which inputs stored in the first ORAM 308 have specified the first output port 222 as a destination. Each of the header decode control signals HA1, HB1, HC1, and HD1 corresponds respectively to Input A, Input B, Input C, and Input D, and would be high if the respective input has specified the first output port as a destination.

In the example of FIGS. 1 and 2, Input C and Input D both specify the first output port as a destination. Thus, HC1 and HD1 would be high, while HA1 and HB1 would be low. Thus, the header decode control signals indicate the set of contending inputs for an output port. The function of the correctly routing control unit is to select one input from the set of contending inputs to be correctly routed to the output port 222.

The correctly routing control unit includes four correctly route control signal generators, 402, 404, 406, and 408. Each correctly route control signal generator receives a respective header decode signal and generates a respective correctly route control signal for a respective input in the first ORAM 212. Thus, the first correctly route control signal generator 402 receives header decode signal HA1 and provides correctly route control signal RA1. The second correctly route control signal generator 404 receives header decode signal HB1 and provides correctly route control signal RB1. The third correctly route control signal generator 406 receives header decode signal HC1 and provides correctly route control signal RC1. The fourth correctly route control signal generator 408 receives header decode signal HD1 and provides correctly route control signal RD1.

The correctly routing control unit also includes a token ring 410. The function of the token ring is to create a sequential order of the inputs within the set of contending inputs at an output port. The input to be routed to that output port is selected from the set of contending inputs according to this sequential order. The token ring varies this sequential order with every switching cycle to provide fair access for all contending inputs to an output port. The token ring includes a high token that is shifted among the four correctly route control signal generators.

Each correctly route control signal generator has an OR gate and two AND gates. For example, the first correctly route control signal generator 402 includes an OR gate 412, and AND gates 414 and 416. Because AND gates 416, 422, 428, and 434 input respectively the header decode control signals HA1, HB1, HC1, and HD1, and output respectively the correctly route signals RA1, RB1, RC1, and RD1, any correctly route control signal corresponding to any low header decode control signal will also be low. Thus, the correctly route control signals RA1, RB1, RC1, and RD1 corresponding to any inputs that do not specify the first output port 222 as a destination are automatically made low. In the example crossconnect of FIGS. 1 and 2, HA1 and HB1 are low, and thus RA1 and RB1 are made low.

Meanwhile, HC1 and HD1 are high, and the correctly routing control unit must determine which one of the corresponding correctly route control signals RC1 and RD1 should be high. The token ring 410 and the OR gates 412, 418, 424, and 430 and the AND gates 414, 420, 426, and 432 make that determination. Since the third correctly route control signal generator 406 is closer to the high token in the token ring 410 than the fourth correctly route control signal generator 408, RC1 is made high. The AND gate 426 of the third correctly route control signal generator 406 sends a signal to all other correctly route control signal generators indicating that a high correctly route control signal has already been generated and that all other correctly route control signals should be made low. In this manner, the correctly routing control unit has selected one input from the set of contending inputs to be correctly routed to the first output port 222. Thus, RC1 is made high and RA1, RB1, and RD1 are made low. These signals cause the first ORAM 212 to correctly route Input C to the first output port 222.

In like manner, a respective correctly routing control unit similar in circuit topology to the correctly routing control unit of FIG. 4 would determine the correctly route control signals for each of the other output ports. In the example crossconnect of FIGS. 1 and 2, Input A specifies the second output port 224 as a destination. Thus, for the header decode signals HA2, HB2, HC2, and HD2 provided to a respective correctly routing control unit for the second output port 224, HA2 is high, while HB2, HC2, and HD2 are low. These header decode control signals would result in the respective correctly routing control unit generating the correctly route control signals RA2, RB2, RC2, and RD2, with RA2 being high and RB2, RC2, and RD2 being low. These correctly route control signals would direct the second ORAM 214 of FIG. 3 to correctly route Input A to the second output port 224.

Similarly, no input specifies the third output port 226 as a destination. Thus, the header decode signals HA3, HB3, HC3, and HD3 provided to a respective correctly routing control unit for the third output port 226 would all be low. The correctly route control signals RA3, RB3, RC3 and RD3 generated by the respective correctly routing control unit would also all be low. These correctly route control signals direct the third ORAM 216 to not correctly route any input to the third output port 226.

Finally, Input B specifies the fourth output port 228 as a destination. Thus, for the header decode control signals HA4, HB4, HC4, and HD4 provided to a respective correctly routing control unit for the fourth output port, HB4 would be high and HA4, HC4 and HD4 would be low. The respective correctly routing control unit would generate the correctly route control signals RA4, RB4, RC4, and RD4, with RB4 being high and RA4, RC4, and RD4 being low. These signals direct the fourth ORAM 218 to correctly route Input B to the fourth output port 228.

Figure 5:
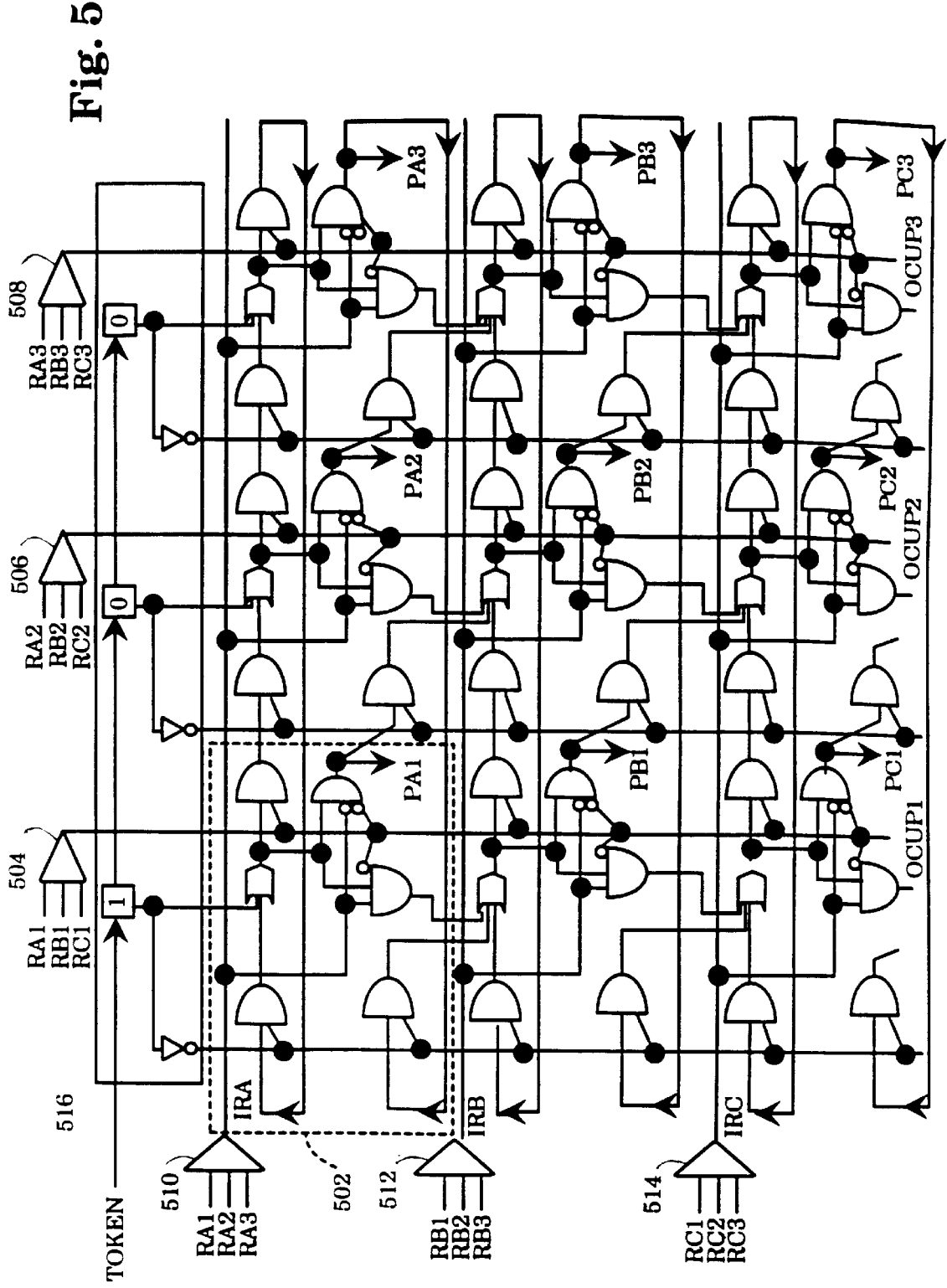
FIG. 5 shows a schematic diagram of a control circuit for misrouting to an available output port any input signal that cannot be correctly routed to its respective destination, according to an embodiment of the present invention.

Once the correctly route control signals are generated for all output ports, the misroute control signals are generated by the control for misrouting 306 of FIG. 3, a preferred embodiment of which is shown in FIG. 5 for a three input/three output switching matrix. This matrix can be extended to cover any number of inputs and outputs by replicating additional rows of the circuit at connections 520, 522, 524, 526, 528, 530, OCUP1, OCUP2, and OCUP3. The correctly route control signals indicate which of the inputs has been correctly routed to a respective destination output port of the switching matrix. In turn, the correctly route control signals also indicate which of the inputs has not been correctly routed and which of the output ports is not already busy with an input routed to it by the control for correctly routing 304.

The control for misrouting 306 receives the correctly route control signals and uses them to determine a set of inputs that have not been correctly routed and a set of available output ports that have not already received a correctly routed input. The function of the control for misrouting is to provide misroute control signals to the ORAMs, directing the respective ORAM of an available output port of the switching matrix to misroute an input to the output port. The control for misrouting inputs receives the correctly route control signals generated by the control for correctly routing 304 and generates the misroute control signals PA1, PB1, PC1, PA2, PB2, PC2, PA3, PB3, and PC3.

Figure 6:
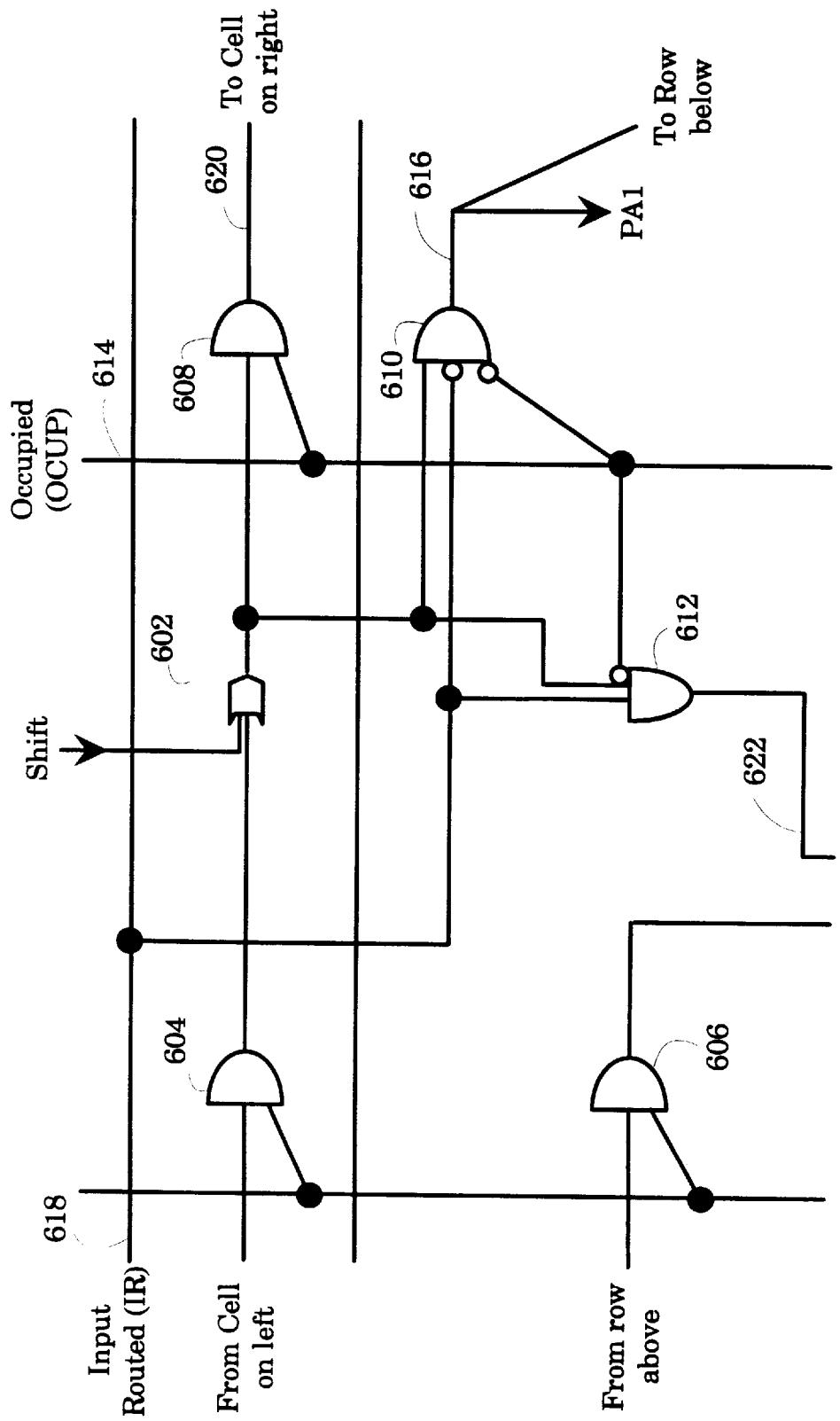
FIG. 6 shows one unit of the control circuit for misrouting of FIG. 5.

The control for misrouting 306 has a respective misroute control signal generator 502 for each of the misroute control signals, shown in detail in FIG. 6 for one embodiment of the invention. A misroute control signal generator includes an OR gate 602, and five AND gates 604, 606, 608, 610, and 612. In FIG. 5, a first column of such generators provides the misroute control signals PA1, PB1, and PC1 that control the first ORAM 222, which is operatively connected to the first output port 212. Similarly, a second column of such generators provides the misroute control signals PA2, PB2, and PC2 that control the second ORAM 214, which is operatively connected to the second output port 224. And finally, a third column of such generators provides the misrouting control signals PA3, PB3, and PC3 that control the third ORAM 216, which is operatively connected to the third output port 226.

The OR gates 504, 506, and 508 provide occupied signals to the misroute control signal generators. These OR gates determine a set of available output ports in the following manner. In FIG. 6, the occupied signal from one such OR gate is applied on an OCUP line 614 of the misroute control signal generator. This signal indicates whether an output port has already received a correctly routed input. In FIG. 5, a high output of OR gate 504 would indicate that the first output port 222 has already received a correctly routed input. Similary, a high output of OR gate 506 would indicate that the second output port 224 has already received a correctly routed input. And finally, a high output of OR gate 508 would indicate that the third output port 226 has already received a correctly routed input. Conversely, if the output of any of these OR gates is low, then the corresponding output port is available.

Referring to FIG. 6, the OCUP signal on a vertical line 614 is inverted and applied to the AND gate 610. The output of this AND gate is the misroute control signal to be provided to an ORAM. Thus, if the OCUP signal applied to a misroute control signal generator is high, then the generator would automatically provide a low misroute control signal at the output 616 of the AND gate 610.

In FIG. 5, each output of the OR gates 504, 506, and 508 are applied to a respective column of misroute control signal generators. If the output of any such OR gates is high, then the respective output port of that column has already received a correctly routed input. Thus, all of the corresponding misroute control signals, PA, PB, and PC for that respective column would be low, indicating that the associated output port is not available for misrouting.

In FIG. 5, a first row of misroute control signal generators provides the misroute control signals PA1, PA2, and PA3, which are signals indicating whether Input A has been correctly routed. Similarly, a second row of misroute control signal generators provides the misroute control signals PB1, PB2, and PB3, which are signals indicating whether Input B has been correctly routed. And finally, a third row of misroute control signal generators provides the misroute control signals PC1, PC2, and PC3, which are signals indicating whether Input C has been correctly routed.

The OR gates 510, 512, and 514 provide input routed signals to the rows of misroute control signal generators. These OR gates determine a set of potentially misrouted inputs in the following manner. In FIG. 6, such an input routed signal from one such OR gate is applied on a Input Routed line 618 of the misroute signal generator. This signal indicates whether an input has been correctly routed.

In FIG. 5, a high output of OR gate 510 would indicate that Input A has been correctly routed it its respective destination by the correctly routing control 304 of FIG. 3. Similarly a high output of OR gate 512 would indicate that Input B has been correctly routed it its respective destination. And finally, a high output of OR gate 514 would indicate that Input C has been correctly routed it its respective destination. Conversely, if the output of any of these OR gates is low, then the corresponding input has not been correctly routed and is an element of the set of potentially misrouted inputs.

Referring to FIG. 6, the Input Routed signal on a horizontal line 618 is inverted and applied to the AND gate 610. The output 616 of this AND gate provides the misroute control signal for the misroute control signal generator. Thus, if the Input Routed signal applied to a misroute control signal generator is high, then the generator would automatically provide a low misroute control signal at the output 616 of the AND gate 610.

In FIG. 5, each output of the OR gates 510, 512, and 514 are applied to a respective row of misroute control signal generators. If the output of any such OR gates is high, the respective input for that OR gate has been correctly routed to its respective destination by the control for correctly routing 304. Thus, all of the corresponding misroute control signals PX1, PX2, and PX3, where X stands for the Input letter, for that respective row would be low, indicating that the respective input should not be misrouted.

With the set of available output ports and the set of potentially misrouted inputs thus determined, the control for misrouting routes each input of the set of potentially misrouted inputs to an available output port in the the following manner. The control for misrouting includes a token ring 516. The function of this token ring is to create a sequential order within the set of available output ports. The available output ports are sent an input from the set of potentially misrouted inputs according to this sequential order. The token ring varies this sequential order with each switching cycle and thereby provides a fair chance for all available output ports to receive a misrouted input.

In the control for misrouting, the high token is at the first column. Thus, the first output port, corresponding to the first column, is examined first. If the first output port has already received an input, the output of the OR gate 504 is high, and all misroute control signals, PA1, PB1, and PC1, from the first column become low. Then, the column to the right of the first column which corresponds to the second output port would be examined next for availability and so on to the subsequent columns until an available output port is found.

Once an available output port is found, an input from the set of potentially misrouted inputs is routed to the available output port. For example, if the first output port were available, then each input is examined within the first column until an input that has not been correctly routed is found. In FIG. 6, for example, if Input A were not correctly routed already, then PA1 would go high, and control signals indicating that Input A has been misrouted to the first output port 222 would be sent to the subsequent columns and rows via lines 616, 620, and 622 from the corresponding misroute control signal generator 502. These control signals preclude other available output ports from receiving Input A and other potentially misrouted inputs from being routed into the first output port 222.

In the above example where the first output port 222 is available, if Input A were already routed, either correctly routed or misrouted, then a control signal on line 622 would indicate that the next input, Input B should be examined. The routed status of Input B is examined in a manner similar to that for Input A. The inputs are thus examined in a sequential order until an input that has not been already routed is found for the first output port 222. Once such an input is found, control signals indicating that a given input has been misrouted to the first output port 222 would be sent to the subsequent columns and rows of misroute control signal generators. This manner of finding an input that has not been already either correctly routed or misrouted is repeated for the rest of the columns in the control for misrouting.

The high token of the token ring 516 gets shifted during every switching cycle. Thus, each column has a fair chance of being the starting point of examination for availability for misrouting, and if available, for being routed the first input in the sequence of inputs that have not already been either correctly routed or misrouted. Then, each subsequent column from this starting column is examined for availability and if the corresponding output port is available, it is routed the subsequent input in the sequence of inputs that has not already been correctly routed or misrouted.

In this manner, the misroute control signals are generated to indicate which input that has not been correctly routed is to be misrouted to a unique one of the available output ports. The ORAMs perform the routing of the inputs to the output ports. The misroute control signals are logically ORed respectively with the correctly route control signals. The resulting signals of this logical ORing are applied to the ORAMs as described for the correctly route control signals in the example crossconnect of FIG. 2.

All inputs are thus either correctly routed or misrouted to a unique one of the output ports. A contending input that did not get correctly routed to a respective destination is misrouted to an available output port. This feature of the circuit switch matrix of the present invention allows the Merged Buffer Signal Switch to function as needed in order to avoid loss of throughput per port with an increased number of output ports.

While the crossconnects discussed herein are limited to four inputs and four outputs, any number of inputs and outputs can be handled by extending the number of units in the circuit switch matrix of the present invention. Accordingly, the forgoing description is by way of example only and is not intended to be limiting. The invention is limited only as defined in the following claims and equivalents thereof.

What is claimed is:

1. A circuit switch matrix for switching a plurality of inputs to a plurality of output ports, each of said inputs designating one of said ports as a respective destination, said circuit switch matrix comprising, in combination:

a plurality of storing means, each of said storing means operatively connected to a respective one of said output ports, for storing said inputs temporarily until each of said inputs are routed to one of said output ports;

a first control means, operatively connected to said storing means and said output ports, for correctly routing at least one of said inputs to said respective destination if none of said inputs has already been routed to said respective destination, wherein, said first control means includes, in combination at each of said output ports:

an input ordering means, operatively connected to a respective output port, for determining a sequential order of said inputs;

a header decode input for receiving header decode control signals that determine which of said inputs designates said respective output port as a respective destination, to provide a set of contending inputs;

a correctly routing means, operatively connected to said input ordering means and said header decode input, for selecting from said set of contending inputs, a correctly routed input that occurs first in said sequential order of said inputs;

switching means for routing said correctly routed input to said respective output port; and a correct route status output for providing correct route status signals indicating one of whether said correctly routed input has been routed and whether none of said inputs has been routed, to said respective output port by the first control means; and a second control means, operatively connected to said storing means, said output ports, and said first control means, for misrouting any of said inputs that has not been correctly routed by said first control means, to one of said output ports that has not been designated as a respective destination by any of said inputs.

2. A circuit switch matrix for switching a plurality of inputs to a plurality of output ports, each of said inputs designating one of said output ports as a respective destination, said circuit switch matrix comprising, in combination:

a plurality of storing means, each of said storing means operatively connected to a respective one of said output ports, for storing said inputs temporarily until each of said inputs are routed to one of said output ports;

a first control means, operatively connected to said storing means and said output ports, for correctly routing at least one of said inputs to said respective destination if none of said inputs has already been routed to said respective destination, wherein said first control means includes, in combination at each of said output ports:

an input ordering means, operatively connected to a respective output port, for determining a sequential order of said inputs wherein, said input ordering means includes a token ring that determines said sequential order;

a header decode input for receiving header decode control signals that determine which of said inputs designates said respective output port as a respective destination, to provide a set of contending inputs;

a correctly routine means operatively connected to said input ordering means and said header decode input for selecting from said set of contending inputs, a correctly routed input that occurs first in said sequential order of said inputs, and switching means for routine said correctly routed input to said respective output port; and a second control means, operatively connected to said storing means, said output ports, and said first control means, for misrouting any of said inputs that has not been correctly routed by said first control means, to one of said output ports that has not been designated as a respective destination by any of said inputs.

3. A circuit switch matrix for switching a plurality of inputs to a plurality of output ports, each of said inputs designating one of said output ports as a respective destination, said circuit switch matrix comprising, in combination;

a plurality of storing means, each of said storing means operatively connected to a respective one of said output ports, for storing said inputs temporarily until each of said inputs are routed to one of said output ports;

a first control means, operatively connected to said storing means and said output ports, for correctly routing at least one of said inputs to said respective destination if none of said inputs has already been routed to said respective destination, wherein said first control means provides correct route Status signals indicating that said at least one input has been correctly routed to said respective destination; and a second control means, operatively connected to said storing means, said output ports, and said first control mean, for misrouting any of said inputs that has not been correctly routed by said first control means, to one of said output ports that has not been designated as a respective destination by any of said inputs wherein, said second control means includes, in combination:

an output port ordering means for determining a first sequential order of said output ports;

a correct route status input for receiving said correct route status signals;

means for determining, from said correct route status signals, which of said output ports has not been correctly routed to within the first control means, to provide a first set of available output ports;

means for determining, from said correct route status signals, which of said inputs has not been correctly routed within the first control means, to provide a second set of potentially misrouted inputs;

a misrouted input ordering means for determining a second sequential order of said potentially misrouted inputs; and misrouting means for routing to each output port in said first set of available output ports, in order of said first sequential order, a respective misrouted input from said second set of potentially misrouted inputs, in order of said second sequential order.

4. The circuit switch matrix of claim 3 wherein, in said misrouting means, said respective misrouted input is deleted from said second set of potentially misrouted inputs when routed to one of said available output ports such that each of said potentially misrouted inputs is routed to a unique one of said available output ports.

5. The circuit switch matrix of claim 3 wherein, said second control means further includes, in combination:

a misroute status output for providing misroute status signals indicating which of said available output ports has been routed to with said respective misrouted input.

6. The circuit switch matrix of claim 3 wherein, said output port ordering means includes a token ring that determines said first sequential order.

7. The circuit switch matrix of claim 3 wherein, said misrouted input ordering means includes a token ring that determines said second sequential order.

8. The circuit switch matrix of claim 3 wherein, said misrouting means routes a null input to any of said available output ports that is not routed to with one of said potentially misrouted inputs, when a first number of said available output ports is greater than a second number of said potentially misrouted inputs.

9. A circuit switch matrix for switching a plurality of data packets to a plurality of output ports, each of said data packets designating one of said output ports as a respective destination, said circuit switch matrix comprising, in combination:
a plurality of ORAMs, each of said ORAMs operatively connected to a respective one of said output ports, for storing said data packets temporarily until each of said data packets are routed to one of said output ports;
a first control means, operatively connected to said ORAMs and said output ports, for correctly routing at least one of said data packets to said respective destination if none of said data packets has already been routed to said respective destination, said first control means including in combination at each of said output ports:
a first token ring, operatively connected to a respective output port, for determining a first sequential order of said data packets;
a header decode input for receiving header decode control signals that determine which of said data packets designates said respective output port as a respective destination, to provide a first set of contending data packets;
a correctly routing means, operatively connected to said first token ring and said header decode input, for selecting from said first set of contending data packets, a correctly routed data packet that occurs first in said first sequential order of said data packets;
switching means for routing said correctly routed data packet from said respective ORAM to said respective output port; and
a correct route status output for providing correct route status signals indicating one of whether said correctly routed input has been routed and whether none of said inputs has been routed, to said respective output port by the first control means; and
a second control means, operatively connected to said ORAMs, said output ports, and said first control means, for misrouting any of said data packets that has not been correctly routed by said first control means, to one of said output ports that has not been designated as a respective destination by any of said data packets, said second control means including, in combination:
a second token ring for determining a second sequential order of said output ports;
a correct route status input for receiving said correct route status signals;
means for determining, from said correct route status signals, which of said output ports has not been correctly routed to within the first control means, to provide a second set of available output ports;
means for determining, from said correct route status signals, which of said inputs has not been correctly routed within the first control means, to provide a third set of potentially misrouted inputs;
a third token ring for determining a third sequential order of said potentially misrouted inputs; and
misrouting means for routing to each output port in said second set of available output ports, in order of said second sequential order, a respective misrouted input from said third set of potentially misrouted inputs, in order of said third sequential order, wherein said respective misrouted input is deleted from said third set of potentially misrouted inputs when routed to one of said available output ports such that each of said potentially misrouted inputs is routed to a unique one of said available output ports.

10. A method for switching a plurality of inputs to a plurality of output ports, each of said inputs designating one of said output ports as a respective destination, the method including in combination, the steps of:
A. storing said inputs at each of said output ports, temporarily until each of said inputs are routed to one of said output ports;
B. correctly routing at least one of said input to said respective destination if none of said inputs had already been routed to said respective destination including, in combination for each output port, the steps of,
E. determining a sequential order of said inputs at a respective output port;
F. determining which of said inputs designates said respective output port as a respective destination, to provide a set of contending inputs;
G. selecting from said set of contending inputs, a correctly routed input that occurs first in said sequential order of said inputs;
H. routing said correctly routed input to said respective output port; and
I. providing correct route status signals indicating one of whether said correctly routed input has been routed and whether none of said inputs has been routed, to said respective output port; and
C. misrouting any of said inputs that has not been correctly routed in said step B to one of said output ports that has not been designated as a respective destination by any of said inputs.

11. A method for switching a plurality of inputs to a plurality of output ports, each of said inputs designating one of said output ports as a respective destination, the method including in combination, the steps of:
A. storing said inputs at each of said output ports, temporarily until each of said inputs are routed to one of said output ports;
B. correctly routing at least one of said input to said respective destination if none of said inputs had already been routed to said respective destination including, in combination for each output port, the steps of:
E. determining a sequential order of said inputs at a respective output port using a token ring;
F. determining which of said inputs designates said respective output port as a respective destination, to provide a set of contending inputs;
G. selecting from said set of contending inputs, a correctly routed input that occurs first in said sequential order of said inputs; and
H. routine said correctly routed input to said respective output port; and
C. misrouting any of said inputs that has not been correctly routed in said step B to one of said output ports that has not been designated as a respective destination by any of said inputs.

12. A method for switching a plurality of inputs to a plurality of output ports, each of said inputs designating one of said output ports as a respective destination, the method including in combination, the steps of:

A. storing said inputs at each of said output ports, temporarily until each of said inputs are routed to one of said output ports;

B correctly routing at least one of said input to said respective destination if none of said inputs had already been routed to said respective destination, including the step of:

J. providing correct route status signals indicating that said at least one input has been correctly routed to said respective destination; and C. misrouting any of said inputs that has not been correctly routed in said step B to one of said output ports that has not been designated as a respective destination by any of said inputs, further including in combination, the steps of:

K. determining a first sequential order of said output ports;

L. receiving said correct route status signals;

M. determining from said correct route status signals, which of said output ports has not been correctly routed to in said step B, to provide a first set of available output ports;

N. determining from said correct route status signals, which of said inputs has not been correctly routed in said step B, to provide a second set of potentially misrouted inputs, O. determining a second sequential order of said potentially misrouted inputs; and P. routing to each output port in said first set of available output ports, in order of said first sequential order, a respective misrouted input from said second set of potentially misrouted inputs, in order of said second sequential order.

13. The method of claim 12 wherein, said step C further includes in combination, the step of:

Q. deleting said respective misrouted input from said second set of potentially misrouted inputs when routed to one of said available output ports such that each of said potentially misrouted inputs is routed to a unique one of said available output ports.

14. The method of claim 12 wherein, said step C further includes in combination, the step of:

R. providing misroute status signals indicating which of said available output ports has been routed to with said respective misrouted input.

15. The method of claim 12 wherein, a token ring is used for said step K of determining said first sequential order of said output ports.

16. The method of claim 12 wherein, a token ring is used for said step O of determining said second sequential order of said potentially misrouted inputs.

17. The method of claim 12 wherein, said step C further includes in combination, the step of, S. routing a null input to any of said available output ports that is not routed to with one of said misrouted inputs, when a first number of said available output ports is greater than a second number of said potentially misrouted inputs.

* * * * *

UNITED STATES PATENT AND TRADEMARK OFFICE
CERTIFICATE OF CORRECTION

PATENT NO. : 5,774,463
DATED : June 30, 1998
INVENTOR(S) : Michael Cooperman et al.

It is certified that error appears in the above-identified patent and that said Letters Patent is hereby corrected as shown below:

Col. 9, line 1
     replace "designating one of said ports as a respective..."
     with --designating one of said output ports as a respective...--.

Signed and Sealed this

Fifteenth Day of September, 1998

Attest:

BRUCE LEHMAN

Attesting Officer     Commissioner of Patents and Trademarks